US010694520B2

(12) United States Patent
Zhang et al.

(10) Patent No.: US 10,694,520 B2
(45) Date of Patent: Jun. 23, 2020

(54) UPLINK TRANSMISSION RESOURCE ALLOCATION METHOD, BASE STATION, AND USER EQUIPMENT

(71) Applicant: SHARP KABUSHIKI KAISHA, Sakai, Osaka (JP)

(72) Inventors: Meng Zhang, Shanghai (CN); Renmao Liu, Shanghai (CN); Ningjuan Chang, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/068,287

(22) PCT Filed: Jan. 5, 2017

(86) PCT No.: PCT/CN2017/070256
§ 371 (c)(1),
(2) Date: Jul. 5, 2018

(87) PCT Pub. No.: WO2017/118396
PCT Pub. Date: Jul. 13, 2017

(65) Prior Publication Data
US 2019/0021089 A1   Jan. 17, 2019

(30) Foreign Application Priority Data

Jan. 7, 2016  (CN) .......................... 2016 1 0009055

(51) Int. Cl.
*H04W 4/00* (2018.01)
*H04W 72/04* (2009.01)
(52) U.S. Cl.
CPC ...... *H04W 72/0453* (2013.01); *H04W 72/042* (2013.01)
(58) Field of Classification Search
CPC ............................................... H04W 72/0453
See application file for complete search history.

(56) References Cited

U.S. PATENT DOCUMENTS

| 8,300,716 B1* | 10/2012 | Lee | ........ H04L 1/0003 370/241 |
| 2007/0217362 A1* | 9/2007 | Kashima | ........ H04W 72/04 370/330 |

(Continued)

OTHER PUBLICATIONS

Samsung, "Narrowband LTE Uplink Design (update of GP-150688)" GP-150845, 3GPP TSG GERAN #67, Yinchuan, China, Aug. 10-Aug. 14, 2015.

(Continued)

*Primary Examiner* — Gerald A Smarth
(74) *Attorney, Agent, or Firm* — ScienBiziP, P.C.

(57) ABSTRACT

The present invention provides a method executed by a base station, comprising: generating a first indication and a second indication for uplink transmission resource allocation for a tone group, wherein the tone group is used as a resource allocation unit and comprises one or more tones; and sending to a UE an RRC message including the first indication, and sending to the UE downlink control information carried by an NB-PDCCH, wherein the downlink control information includes the second indication. Accordingly, the present invention further provides a method executed by a user equipment, the method comprising: receiving, from a base station, an RRC message, wherein the RRC message comprises a first indication for uplink transmission resource allocation for a tone group; receiving, from the base station, downlink control information carried by an NB-PDCCH, wherein the downlink control information comprises a second indication for uplink transmission resource allocation for the tone group; and allocating resources for uplink transmission according to the first indication and the second indication. The present invention further provides a base station and a UE respectively executing the above-described methods.

2 Claims, 6 Drawing Sheets

(56) References Cited

U.S. PATENT DOCUMENTS

| | | | | |
|---|---|---|---|---|
| 2007/0249296 A1* | 10/2007 | Howard | ............... | H04B 7/0421 |
| | | | | 455/101 |
| 2009/0110086 A1* | 4/2009 | Kozlov | ............... | H04L 27/2608 |
| | | | | 375/260 |
| 2010/0328541 A1* | 12/2010 | Wu | ....................... | H04L 5/0048 |
| | | | | 348/724 |

OTHER PUBLICATIONS

Qualcomm Incorporated, "In-band Design for NB-IOT", R1-155748, 3GPP TSG RAN WG1 #82 BIS, Oct. 5-9, 2015, Malmö, Sweden.

Qualcomm Incorporated, New Work Item: NarrowBand IOT (NB-IOT), RP-151621, 3GPP TSG RAN Meeting #69, Phoenix, USA, Sep. 14-16, 2015.

Ericsson, NSN, New Work Item on Even Lower Complexity and Enhanced Coverage LTE UE for MTC, RP-140990, 3GPP TSG RAN Meeting #64, Sophia Antipolis, France, Jun. 10-13, 2014.

\* cited by examiner

UPLINK TRANSMISSION RESOURCE ALLOCATION METHOD, BASE STATION, AND USER EQUIPMENT

TECHNICAL FIELD

The present invention relates to the field of wireless communication technology. More specifically, the present invention relates to an uplink transmission resource allocation method, a base station, and a user equipment.

BACKGROUND

With rapid growth of mobile communications and great progress of technology, the world will move towards a fully interconnected network society where anyone or anything can get information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing an in-depth study.

In the standard of Long Term Evolution (LTE) of the Third Generation Partnership Project (3GPP), machine-to-machine communication is called machine type communication (MTC). MTC is a data communication service that does not require human participation. Deployment of large-scale MTC user equipments can be used in such fields as security, tracking, billing, measurement and consumer electronics, and specifically relates applications, including video monitoring, supply chain tracking, intelligent meter reading, and remote monitoring. MTC requires lower power consumption and supports lower data transmission rate and lower mobility. The current LTE system is mainly for man-to-man communication services. The key to achieving competitive advantages of scale and application prospects of MTC services is that the LTE network supports low-cost MTC devices.

In addition, some MTC user equipments need to be installed in the basement of a residential building or at a position within the protection of an insulating foil, a metal window, or a thick wall of a traditional building; MTC suffers from more serious and obvious penetration losses from air interfaces, compared to that of conventional equipment terminals (such as mobile phones and tablet computers) in LTE networks. 3GPP decides to study the project design and performance evaluation of MTC equipments with enhanced additional 20 dB coverage. It should be noted that MTC equipments located at poor network coverage areas have the following characteristics: extremely low data transmission rates, low latency requirements, and limited mobility. In view of the above characteristics of MTC, the LTE network can further optimize some signals and/or channels to better support MTC services.

Therefore, at the 3GPP RAN #64 plenary session held in June 2014, a new MTC work item with low complexity and enhanced coverage for Rel-13 was proposed (see non-patent literature: RP-140990 New work Item on Even Lower Complexity and Enhanced Coverage LTE UE for MTC, Ericsson, NSN). In the description of this work item, an LTE Rel-13 system needs to support uplink/downlink 1.4 MHz RF bandwidth for an MTC user equipment to operate at any system bandwidth (for example, 1.4 MHz, 3 MHz, 5 MHz, 10 MHz, 15 MHz, or 20 MHz). The standardization of the work item will be completed at the end of 2015.

In addition, in order to better implement the Internet of Everything, another new work item was proposed at the 3GPP RAN #69 general meeting held in September 2015 (see Non-Patent Document: RP-151621 New Work Item: NarrowBand IoT (NB-IoT)), which we refer to as Narrowband Internet of Things (NB-IoT). In the description of this item, an NB-IoT user equipment (UE) will support uplink/downlink 180 kHz RF bandwidth. In the existing LTE system, a minimum granularity for resource allocation of the UE is one physical resource block (PRB). That is to say, resource allocation for a physical uplink shared channel (PUSCH) and a physical uplink control channel (PUCCH) of the existing LTE system is based on a PRB. However, the NB-IoT UE supports uplink/downlink 180 kHz RF bandwidth only, i.e., RF bandwidth having the size of one PRB. A more accurate resource indication method having a smaller granularity is needed.

SUMMARY OF INVENTION

The present invention mainly solves the indication problem for resource allocation for uplink transmission in NB-IoT, using for example an NB-IoT physical uplink control channel (NB-PUCCH) and/or an NB-IoT physical uplink shared channel (NB-PUSCH), in single-tone scenarios and multi-tone scenarios.

According to one aspect of the present invention, a method for uplink transmission resource allocation executed by a user equipment (UE), comprising: receiving, from a base station, a radio resource control (RRC) message, wherein the RRC message comprises first indication information for uplink transmission resource allocation for a tone group, and the tone group is used as a resource allocation unit and comprises one or more tones; receiving, from the base station, downlink control information carried by a narrowband Internet of Things downlink control channel (NB-PDCCH), wherein the downlink control information comprises second indication information for uplink transmission resource allocation for the tone group; and allocating resources for uplink transmission according to the first indication information and the second indication information.

In the method, the first indication information comprises a set of tone groups, and the set of tone groups comprises one or more types of tone groups.

In the situation where the first indication information comprises one type of tone groups, the second indication information comprises a bit string for indicating sequence numbers of the type of tone groups for uplink transmission in a system bandwidth.

In the situation where the first indication information comprises multiple types of tone groups, the second indication information comprises a bit string, and the bit string comprises a first field indicating the types of the tone groups for uplink transmission and a second field indicating sequence numbers of the tone groups for uplink transmission.

According to another aspect of the present invention, a method for uplink transmission resource allocation executed by a base station, comprising: generating first indication information and second indication information for uplink transmission resource allocation for a tone group, wherein the tone group is used as a resource allocation unit and comprises one or more tones; and sending to a user equipment (UE) a radio resource control (RRC) message comprising the first indication information, and sending to the UE downlink control information carried by a narrowband physical downlink control channel (NB-PDCCH), wherein the downlink control information comprises the second indication information.

In the method, the first indication information comprises a set of tone groups, and the set of tone groups comprises one or more types of tone groups.

In the situation where the first indication information comprises one type of tone groups, the second indication information comprises a bit string for indicating sequence numbers of the type of tone groups for uplink transmission in a system bandwidth.

In the situation where the first indication information comprises multiple types of tone groups, the second indication information comprises a bit string, and the bit string comprises a first field indicating the types of the tone groups for uplink transmission and a second field indicating sequence numbers of the tone groups for uplink transmission.

According to another aspect of the present invention, a method for uplink transmission resource allocation executed by a user equipment (UE), comprising: receiving, from a base station, a radio resource control (RRC) message, wherein the RRC message comprises first indication information for indicating whether hybrid multi-tone is supported, and supporting hybrid multi-tone being that transmission of multiple types of tone groups in one physical resource block is allowed; receiving, from the base station, downlink control information carried by a narrowband Internet of Things downlink control channel (NB-PDCCH), wherein the downlink control information comprises second indication information for uplink transmission resource allocation for the tone group; and allocating resources for uplink transmission according to the first indication information and the second indication information.

In the method, the second indication information comprises a bitmap for indicating resource allocation for uplink transmission.

Alternatively, the second indication information comprises a bit string, and the bit string comprises a first field indicating the types of the tone groups for uplink transmission and a second field indicating sequence numbers of the tone groups for uplink transmission.

According to another aspect of the present invention, a method for uplink transmission resource allocation executed by a base station, comprising: generating first indication information for indicating whether hybrid multi-tone is supported, wherein supporting hybrid multi-tone being that transmission of multiple types of tone groups in one physical resource block is allowed, and generating second indication information for uplink transmission resource allocation for a tone group; and sending to a user equipment (UE) a radio resource control (RRC) message comprising the first indication information, and sending to the UE downlink control information carried by a narrowband physical downlink control channel (NB-PDCCH), wherein the downlink control information comprises the second indication information.

In the method, the second indication information comprises a bitmap for indicating resource allocation for uplink transmission.

Alternatively, the second indication information comprises a bit string, and the bit string comprises a first field indicating the types of the tone groups for uplink transmission and a second field indicating sequence numbers of the tone groups for uplink transmission.

According to another aspect of the present invention, a method for uplink transmission resource allocation executed by a user equipment (UE), comprising: receiving, from a base station, downlink control information carried by a narrowband Internet of Things downlink control channel (NB-PDCCH), wherein the downlink control information comprises indication information for uplink transmission resource allocation for a tone group, and the tone group is used as a resource allocation unit and comprises one or more tones; and allocating resources for uplink transmission according to the indication information.

In the method, the indication information comprises a bit string, and the bit string comprises a first field indicating the types of the tone groups for uplink transmission and a second field indicating sequence numbers of the tone groups for uplink transmission.

Alternatively, the indication information comprises a bit string that enables the UE to find allocated resources by referring to a mapping table.

Alternatively, the indication information indicates reusing an uplink resource allocation type 0 of LTE and replacing $N_{RB}^{UL}$ with $N_{SC}^{UL,NB\text{-}IOT}$, wherein $N_{RB}^{UL}$ being the number of physical resource blocks in an LTE uplink bandwidth, and $N_{SC}^{UL,NB\text{-}IOT}$ being the number of tones or subcarriers in one physical resource block in narrowband Internet of Things.

Alternatively, the indication information comprises a bitmap for indicating resource allocation for uplink transmission.

According to another aspect of the present invention, a method for uplink transmission resource allocation executed by a base station, comprising: generating indication information for uplink transmission resource allocation for a tone group, wherein the tone group is used as a resource allocation unit and comprises one or more tones; and sending to a user equipment (UE) downlink control information carried by a narrowband physical downlink control channel (NB-PDCCH), wherein the downlink control information comprises the indication information.

In the method, the indication information comprises a bit string, and the bit string comprises a first field indicating the types of the tone groups for uplink transmission and a second field indicating sequence numbers of the tone groups for uplink transmission.

Alternatively, the indication information comprises a bit string that enables the UE to find allocated resources by referring to a mapping table.

Alternatively, the indication information indicates reusing an uplink resource allocation type 0 of LTE and replacing $N_{RB}^{UL}$ with $N_{SC}^{UL,NB\text{-}IOT}$, wherein $N_{RB}^{UL}$ being the number of physical resource blocks in an LTE uplink bandwidth, and $N_{SC}^{UL,NB\text{-}IOT}$ being the number of tones or subcarriers in one physical resource block in narrowband Internet of Things.

Alternatively, the indication information comprises a bitmap for indicating resource allocation for uplink transmission.

According to another aspect of the present invention, a user equipment (UE) is provided, comprising:

a transceiver, configured to receive, from a base station, a radio resource control (RRC) message, wherein the RRC message comprises first indication information for uplink transmission resource allocation for a tone group, and the tone group is used as a resource allocation unit and comprises one or more tones; receive, from the base station, downlink control information carried by a narrowband Internet of Things downlink control channel (NB-PDCCH), wherein the downlink control information comprises second indication information for uplink transmission resource allocation for the tone group; and a resource allocation unit, configured to allocate resources for uplink transmission according to the first indication information and the second indication information.

The first indication information comprises a set of tone groups, and the set of tone groups comprises one or more types of tone groups.

In the situation where the first indication information comprises one type of tone groups, the second indication information comprises a bit string for indicating sequence numbers of the type of tone groups for uplink transmission in a system bandwidth.

In the situation where the first indication information comprises multiple types of tone groups, the second indication information comprises a bit string, and the bit string comprises a first field indicating the types of the tone groups for uplink transmission and a second field indicating sequence numbers of the tone groups for uplink transmission.

According to another aspect of the present invention, a base station is provided, comprising:

a generation unit, configured to generate first indication information and second indication information for uplink transmission resource allocation for a tone group, wherein the tone group is used as a resource allocation unit and comprises one or more tones; and a transceiver, configured to send to a user equipment (UE) a radio resource control (RRC) message comprising the first indication information, and send to the UE downlink control information carried by a narrowband physical downlink control channel (NB-PDCCH), wherein the downlink control information comprises the second indication information.

The first indication information comprises a set of tone groups, and the set of tone groups comprises one or more types of tone groups.

In the situation where the first indication information comprises one type of tone groups, the second indication information comprises a bit string for indicating sequence numbers of the type of tone groups for uplink transmission in a system bandwidth.

In the situation where the first indication information comprises multiple types of tone groups, the second indication information comprises a bit string, and the bit string comprises a first field indicating the types of the tone groups for uplink transmission and a second field indicating sequence numbers of the tone groups for uplink transmission.

According to another aspect of the present invention, a user equipment (U E) is provided, comprising:

a transceiver, configured to receive, from a base station, a radio resource control (RRC) message, wherein the RRC message comprises first indication information for indicating whether hybrid multi-tone is supported, and supporting hybrid multi-tone being that transmission of multiple types of tone groups in one physical resource block is allowed; and receive, from the base station, downlink control information carried by a narrowband physical downlink control channel (NB-PDCCH), wherein the downlink control information comprises second indication information for uplink transmission resource allocation for a tone group; and a resource allocation unit, configured to allocate resources for uplink transmission according to the first indication information and the second indication information.

The second indication information comprises a bitmap for indicating resource allocation for uplink transmission.

Alternatively, the second indication information comprises a bit string, and the bit string comprises a first field indicating the types of the tone groups for uplink transmission and a second field indicating sequence numbers of the tone groups for uplink transmission.

According to another aspect of the present invention, a base station is provided, comprising:

a generation unit, configured to generate first indication information for indicating whether hybrid multi-tone is supported, wherein supporting hybrid multi-tone being that transmission of multiple types of tone groups in one physical resource block is allowed, and generate second indication information for uplink transmission resource allocation for a tone group; and a transceiver, configured to send to a user equipment (UE) a radio resource control (RRC) message comprising the first indication information, and send to the UE downlink control information carried by a narrowband physical downlink control channel (NB-PDCCH), wherein the downlink control information comprises the second indication information.

The second indication information comprises a bitmap for indicating resource allocation for uplink transmission.

Alternatively, the second indication information comprises a bit string, and the bit string comprises a first field indicating the types of the tone groups for uplink transmission and a second field indicating sequence numbers of the tone groups for uplink transmission.

According to another aspect of the present invention, a user equipment (UE) is provided, comprising:

a transceiver, configured to receive, from a base station, downlink control information carried by a narrowband physical downlink control channel (NB-PDCCH), wherein the downlink control information comprises indication information for uplink transmission resource allocation for a tone group, and the tone group is used as a resource allocation unit and comprises one or more tones; and a resource allocation unit, configured to allocate resources for uplink transmission according to the indication information.

The indication information comprises a bit string, and the bit string comprises a first field indicating the types of the tone groups for uplink transmission and a second field indicating sequence numbers of the tone groups for uplink transmission.

Alternatively, the indication information comprises a bit string that enables the UE to find allocated resources by referring to a mapping table.

Alternatively, the indication information indicates reusing an uplink resource allocation type 0 of LTE and replacing $N_{RB}^{UL}$ with $N_{SC}^{UL,NB-IOT}$, wherein $N_{RB}^{UL}$ being the number of physical resource blocks in an LTE uplink bandwidth, and $N_{SC}^{UL,NB-IOT}$ being the number of tones or subcarriers in one physical resource block in narrowband Internet of Things.

Alternatively, the indication information comprises a bitmap for indicating resource allocation for uplink transmission.

According to another aspect of the present invention, a base station is provided, comprising:

a generation unit, configured to generate indication information for uplink transmission resource allocation for a tone group, wherein the tone group is used as a resource allocation unit and comprises one or more tones; and a transceiver, configured to send to a user equipment (UE) downlink control information carried by a narrowband physical downlink control channel (NB-PDCCH), wherein the downlink control information comprises the indication information.

The indication information comprises a bit string, and the bit string comprises a first field indicating the types of the tone groups for uplink transmission and a second field indicating sequence numbers of the tone groups for uplink transmission.

Alternatively, the indication information comprises a bit string that enables the UE to find allocated resources by referring to a mapping table.

Alternatively, the indication information indicates reusing an uplink resource allocation type 0 of LTE and replacing $N_{RB}^{UL}$ with $N_{SC}^{UL,NB-IOT}$, wherein $N_{RB}^{UL}$ being the number of physical resource blocks in an LTE uplink bandwidth, and $N_{SC}^{UL,NB-IOT}$ being the number of tones or subcarriers in one physical resource block in narrowband Internet of Things.

Alternatively, the indication information comprises a bitmap for indicating resource allocation for uplink transmission.

BRIEF DESCRIPTION OF DRAWINGS

The above and other features of the present invention will become more apparent from the following detailed description in conjunction with the accompanying drawings.

DESCRIPTION OF EMBODIMENTS

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Multiple embodiments according to the present disclosure are specifically described below by using an LTE mobile communications system and its subsequent evolved version as an exemplary application environment. However, it is to be noted that the present disclosure is not limited to the following embodiments, but may be applied to other wireless communication systems, such as a future 5G cellular communication system.

Figure 1:
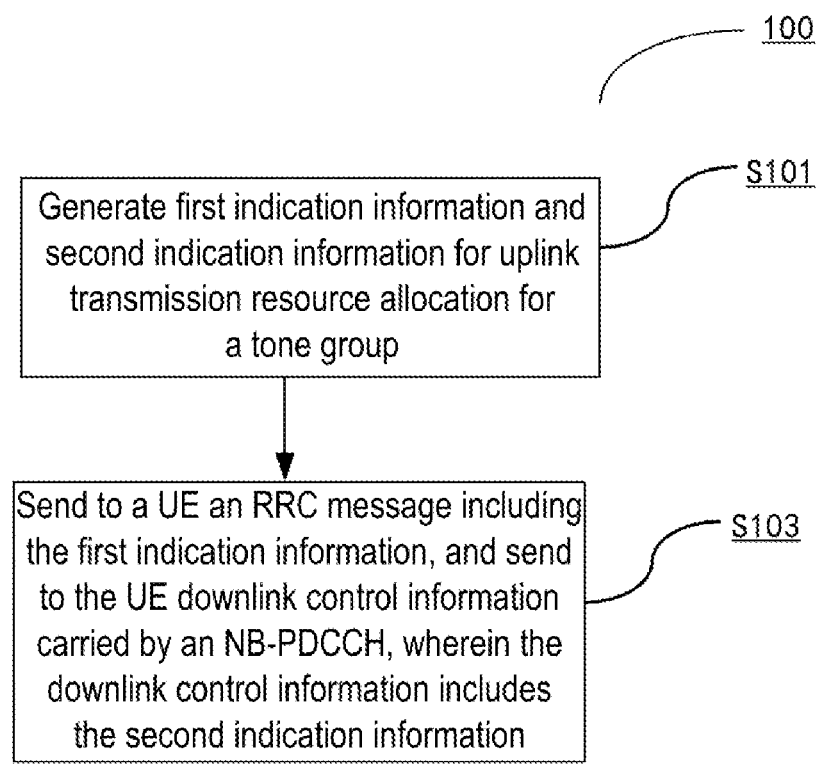
FIG. 1 schematically shows a flowchart of a method for uplink transmission resource allocation executed by a base station according to an embodiment of the present invention.

FIG. 1 schematically shows a flowchart of an uplink resource allocation indication method executed by a base station according to an embodiment of the present invention. As shown in FIG. 1, the method 100 comprises the following steps.

Step S101: The base station generates first indication information and second indication information for uplink transmission resource allocation for a tone group, wherein the tone group is used as a resource allocation unit (namely, the minimum granularity for resource allocation) and comprises one or more tones; and one tone corresponds to one subcarrier or a contiguous frequency domain bandwidth. For example, the base station generates first indication information to be carried by an RRC message and used for resource allocation for an NB-PUCCH and/or NB-PUSCH; and the base station also generates second indication information to be carried by an NB-IoT downlink control channel (NB-PDCCH) and used for resource allocation for the NB-PUCCH and/or NB-PUSCH. It should be understood that the NB-PUCCH and/or NB-PUSCH is presented only as an example of uplink transmission herein, and uplink transmission is not limited to the NB-PUCCH and/or NB-PUSCH.

The first indication information comprises a set of tone groups, and the set of tone groups comprises one or more types of tone groups.

As one embodiment, the first indication information is used for configuring a set of tone groups that can be used for transmitting the NB-PUCCH and/or NB-PUSCH, namely, a set of supported tone groups. A tone group may be composed of 1 tone, 2 tones, 3 tones, 4 tones, 6 tones, or 12 tones.

As one embodiment, the first indication information is denoted as X, and then:

if X={1}, it means that the tone group for transmitting the NB-PUCCH and/or NB-PUSCH is 1-tone;

if X={2}, it means that the tone group for transmitting the NB-PUCCH and/or NB-PUSCH is 2-tone;

if X={3}, it means that the tone group for transmitting the NB-PUCCH and/or NB-PUSCH is 3-tone;

if X={4}, it means that the tone group for transmitting the NB-PUCCH and/or NB-PUSCH is 4-tone;

if X={6}, it means that the tone group for transmitting the NB-PUCCH and/or NB-PUSCH is 6-tone;

if X={12}, it means that the tone group for transmitting the NB-PUCCH and/or NB-PUSCH is 12-tone;

if X={1, 2, 3, 4, 6, 12}, it means that the tone group for transmitting the NB-PUCCH and/or NB-PUSCH may be 1-tone, 2-tone, 3-tone, 4-tone, 6-tone, or 12-tone.

Similarly, if X is any subset of {1, 2, 3, 4, 6, 12}, it means that the tone group for transmitting the NB-PUCCH and/or NB-PUSCH may be a tone group indicated by the subset.

As another embodiment, in the situation where the first indication information includes one type of tone groups, the type of the tone groups for transmitting the NB-PUCCH and/or NB-PUSCH may be determined according to the first indication information; thus, the second indication information includes a bit string indicating sequence numbers of the tone groups for transmitting the NB-PUCCH and/or NB-PUSCH in a system bandwidth.

For example, the second indication information is denoted as Y, and if Y is a bit string having a length of 1, then:

if Y=0, it means that the resource allocation unit for transmitting the NB-PUCCH and/or NB-PUSCH is a tone group having a sequence number of 1;

if Y=1, it means that the resource allocation unit for transmitting the NB-PUCCH and/or NB-PUSCH is a tone group having a sequence number of 2.

For example, if Y is a bit string having a length of 2, then:

if Y=01, it means that the resource allocation unit for transmitting the NB-PUCCH and/or NB-PUSCH is a tone group having a sequence number of 1;

if Y=10, it means that the resource allocation unit for transmitting the NB-PUCCH and/or NB-PUSCH is a tone group having a sequence number of 2;

if Y=11, it means that the resource allocation unit for transmitting the NB-PUCCH and/or NB-PUSCH is a tone group having a sequence number of 3;

if Y=10, it means that the resource allocation unit for transmitting the NB-PUCCH and/or NB-PUSCH is a tone group having a sequence number of 4.

For example, if Y is a bit string having a length of 3, then:

if Y=001, it means that the resource allocation unit for transmitting the NB-PUCCH and/or NB-PUSCH is a tone group having a sequence number of 1;

if Y=010, it means that the resource allocation unit for transmitting the NB-PUCCH and/or NB-PUSCH is a tone group having a sequence number of 2;

if Y=011, it means that the resource allocation unit for transmitting the NB-PUCCH and/or NB-PUSCH is a tone group having a sequence number of 3;

if Y=100, it means that the resource allocation unit for transmitting the NB-PUCCH and/or NB-PUSCH is a tone group having a sequence number of 4;

if Y=101, it means that the resource allocation unit for transmitting the NB-PUCCH and/or NB-PUSCH is a tone group having a sequence number of 5;

if Y=110, it means that the resource allocation unit for transmitting the NB-PUCCH and/or NB-PUSCH is a tone group having a sequence number of 6;

if Y=111, it means that the resource allocation unit for transmitting the NB-PUCCH and/or NB-PUSCH is a tone group having a sequence number of 7;

if Y=000, it means that the resource allocation unit for transmitting the NB-PUCCH and/or NB-PUSCH is a tone group having a sequence number of 8.

Following the same line of reasoning, one knows information indicated by Y when Y is of M bits; that is, tone groups having sequence numbers being values of Y in $2^M$ tone groups of resource allocation units for transmitting the NB-PUCCH and/or NB-PUSCH in the system bandwidth can be obtained.

As another embodiment, in the situation where the first indication information includes multiple types of tone groups, i.e., when the number of elements in the set of the first indication information is greater than 1, the second indication information is composed of two fields denoted as a first field and a second field.

The first field is used for indicating the types of the tone groups for transmitting the NB-PUCCH and/or NB-PUSCH; and the second field is used for indicating sequence numbers of the tone groups for transmitting the NB-PUCCH and/or NB-PUSCH.

For example, if the set of the first indication information is X={1, 2, 3, 4, 6}, then:

if the first field is 000, it means that the tone group for transmitting the NB-PUCCH and/or NB-PUSCH is 1-tone;

if the first field is 001, it means that the tone group for transmitting the NB-PUCCH and/or NB-PUSCH is 2-tone;

if the first field is 010, it means that the tone group for transmitting the NB-PUCCH and/or NB-PUSCH is 3-tone;

if the first field is 011, it means that the tone group for transmitting the NB-PUCCH and/or NB-PUSCH is 4-tone;

if the first field is 100, it means that the tone group for transmitting the NB-PUCCH and/or NB-PUSCH is 6-tone.

Similarly, when X is of other configuration in which the number of elements is greater than 1, the first field may be used to indicate tone groups for transmitting the NB-PUCCH and/or NB-PUSCH.

For another example, if the first indication information is X={1, 2, 3, 4, 6} and the first field is 100, then:

if the second field is 0, it means that the tone group for transmitting the NB-PUCCH and/or NB-PUSCH is 6-tone having a sequence number of 1;

if the second field is 1, it means that the tone group for transmitting the NB-PUCCH and/or NB-PUSCH is 6-tone having a sequence number of 2.

Similarly, when X is of other configuration in which the number of elements is greater than 1, the second field may be used to indicate sequence numbers of tone groups for transmitting the NB-PUCCH and/or NB-PUSCH.

It should be noted that the first field and the second field included in the second indication information herein may be a bit string composed of contiguous bits or may be two separate bit strings, namely, presented as two separate pieces of indication information.

In another embodiment, the first indication information is used for indicating whether a hybrid multi-tone uplink transmission mode is supported. Supporting the hybrid multi-tone uplink transmission mode means that transmission of multiple types of tone groups in one physical resource block (PRB) is allowed. For example, a UE supports 2-tone and 4-tone uplink transmission at the same time in one PRB.

In one implementation manner, the first indication information is a bit string having a length of 1. The first indication information being 0 represents that the hybrid multi-tone uplink transmission mode is supported; the first indication information being 1 represents that the hybrid multi-tone uplink transmission mode is not supported.

In another implementation manner, the first indication information is a bit string having a length of 1. The first indication information being 1 represents that the hybrid multi-tone uplink transmission mode is supported; the first indication information being 0 represents that the hybrid multi-tone uplink transmission mode is not supported.

When the number of elements in the set configured by the first indication information is greater than 1, the second indication information may be a bit string. The second indication information is used for indicating types of tone groups for transmitting the NB-PUCCH and/or NB-PUSCH and sequence numbers of the tone groups.

In another implementation manner, the second indication information may be a bitmap for indicating sequence numbers of the tone groups for transmitting the NB-PUCCH and/or NB-PUSCH.

Step S103: The base station sends to a UE a radio resource control (RRC) message including the first indication information, and sends to the UE downlink control information carried by an NB-PDCCH, wherein the downlink control information includes the second indication information. For example, the base station sends to the UE the first indication information carried by an RRC and used for resource allocation for the NB-PUCCH and/or NB-PUSCH; and the second indication information carried by an NB-PDCCH and used for resource allocation for the NB-PUCCH and/or NB-PUSCH.

Figure 2:
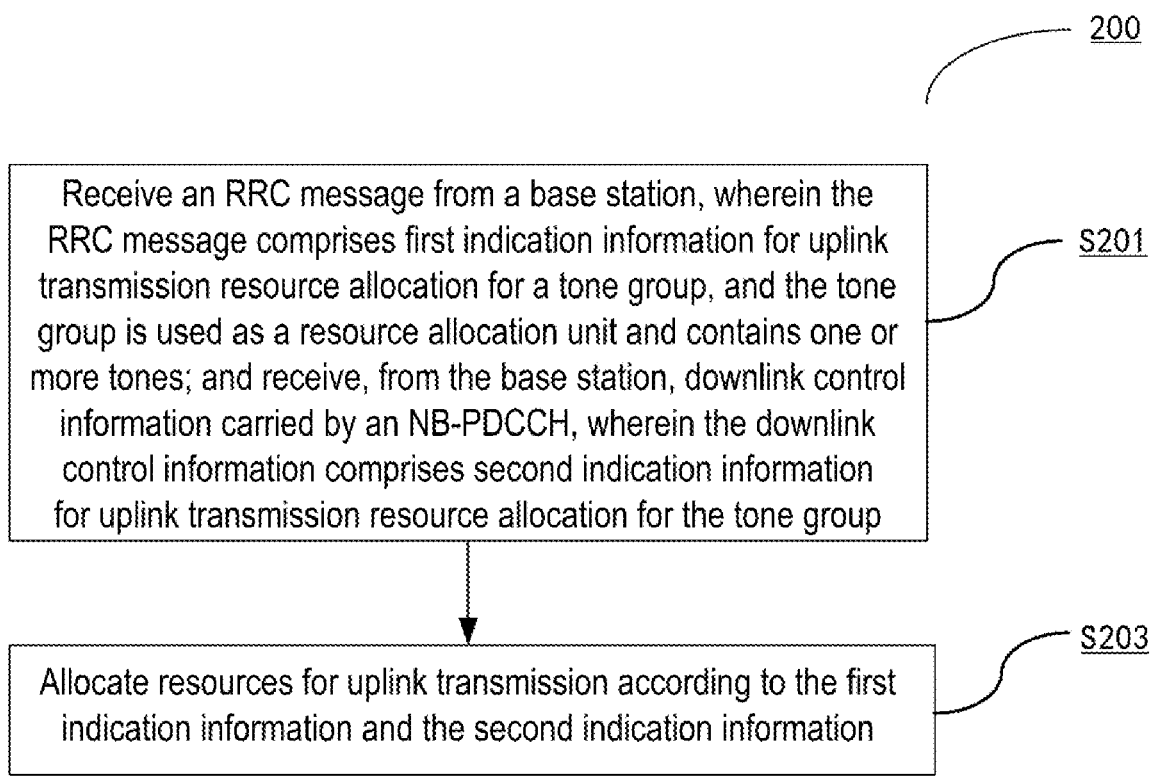
FIG. 2 schematically shows a flowchart of a method for uplink transmission resource allocation executed by a UE according to an embodiment of the present invention.

FIG. 2 schematically shows a flowchart of an uplink resource allocation indication method correspondingly executed by a UE according to an embodiment of the present invention. As shown in FIG. 2, the method 200 comprises the following steps.

Step S201: The UE receives, from a base station, a radio resource control (RRC) message, wherein the RRC message includes first indication information for uplink transmission resource allocation for a tone group, and the tone group is used as a resource allocation unit and comprises one or more tones; and receives, from the base station, downlink control information carried by an NB-PDCCH, wherein the downlink control information comprises second indication information for uplink transmission resource allocation for the tone group. For example, the UE receives, from the base station, the first indication information carried by an RRC and used for resource allocation for the NB-PUCCH and/or NB-PUSCH; and the second indication information carried by an NB-PDCCH and used for resource allocation for the NB-PUCCH and/or NB-PUSCH.

Step S203: The UE allocates resources for uplink transmission according to the first indication information and the second indication information.

Figure 3:
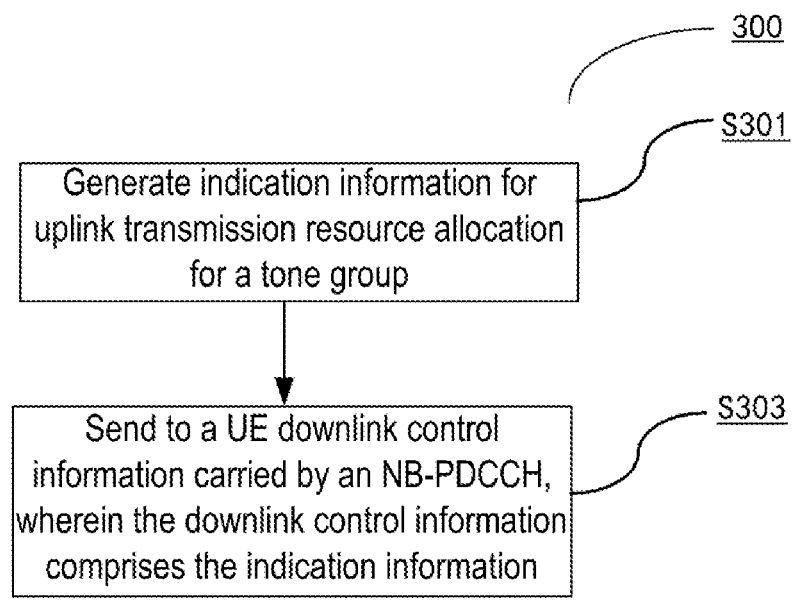
FIG. 3 schematically shows a flowchart of a method for uplink transmission resource allocation executed by a base station according to another embodiment of the present invention.

FIG. 3 shows a flowchart of an uplink resource allocation indication method executed by a base station according to another embodiment of the present invention. As shown in FIG. 3, the method 300 comprises the following steps.

Step S301: The base station generates indication information for uplink transmission resource allocation for a tone group. For example, the base station generates indication information to be carried by an NB-PDCCH and used for resource allocation for an NB-PUCCH and/or NB-PUSCH.

The indication information may include a first field indicating types of tone groups for uplink transmission and a second field indicating sequence numbers of the tone groups for uplink transmission.

In another implementation manner, the indication information may include a bit string that enables a UE to find allocated resources by referring to a mapping table, which is not only applicable to the situation of single-tone uplink transmission but also applicable to the situation of multi-tone uplink transmission.

For example, the indication information is denoted as Z, and then for 15 kHz uplink multi-tone NB-PUCCH and/or NB-PUSCH transmission, the following exemplary mapping table may exist so that the UE can find allocated tone group resources for uplink transmission by referring to the mapping table:

if Z=00001, it means that the NB-PUCCH and/or NB-PUSCH is transmitted using a 1-tone having a sequence number of 1;

if Z=00010, it means that the NB-PUCCH and/or NB-PUSCH is transmitted using a 1-tone having a sequence number of 2;

if Z=00011, it means that the NB-PUCCH and/or NB-PUSCH is transmitted using a 1-tone having a sequence number of 3;

if Z=00100, it means that the NB-PUCCH and/or NB-PUSCH is transmitted using a 1-tone having a sequence number of 4;

if Z=00101, it means that the NB-PUCCH and/or NB-PUSCH is transmitted using a 1-tone having a sequence number of 5;

if Z=00110, it means that the NB-PUCCH and/or NB-PUSCH is transmitted using a 1-tone having a sequence number of 6;

if Z=00111, it means that the NB-PUCCH and/or NB-PUSCH is transmitted using a 1-tone having a sequence number of 7;

if Z=01000, it means that the NB-PUCCH and/or NB-PUSCH is transmitted using a 1-tone having a sequence number of 8;

if Z=01001, it means that the NB-PUCCH and/or NB-PUSCH is transmitted using a 1-tone having a sequence number of 9;

if Z=01010, it means that the NB-PUCCH and/or NB-PUSCH is transmitted using a 1-tone having a sequence number of 10;

if Z=01011, it means that the NB-PUCCH and/or NB-PUSCH is transmitted using a 1-tone having a sequence number of 11;

if Z=01100, it means that the NB-PUCCH and/or NB-PUSCH is transmitted using a 1-tone having a sequence number of 12;

if Z=01101, it means that the NB-PUCCH and/or NB-PUSCH is transmitted using a 2-tone having a sequence number of 1;

if Z=01110, it means that the NB-PUCCH and/or NB-PUSCH is transmitted using a 2-tone having a sequence number of 2;

if Z=01111, it means that the NB-PUCCH and/or NB-PUSCH is transmitted using a 2-tone having a sequence number of 3;

if Z=10000, it means that the NB-PUCCH and/or NB-PUSCH is transmitted using a 2-tone having a sequence number of 4;

if Z=10001, it means that the NB-PUCCH and/or NB-PUSCH is transmitted using a 2-tone having a sequence number of 5;

if Z=10010, it means that the NB-PUCCH and/or NB-PUSCH is transmitted using a 2-tone having a sequence number of 6;

if Z=10011, it means that the NB-PUCCH and/or NB-PUSCH is transmitted using a 3-tone having a sequence number of 1;

if Z=10100, it means that the NB-PUCCH and/or NB-PUSCH is transmitted using a 3-tone having a sequence number of 2;

if Z=10101, it means that the NB-PUCCH and/or NB-PUSCH is transmitted using a 3-tone having a sequence number of 3;

if Z=10110, it means that the NB-PUCCH and/or NB-PUSCH is transmitted using a 3-tone having a sequence number of 4;

if Z=10111, it means that the NB-PUCCH and/or NB-PUSCH is transmitted using a 4-tone having a sequence number of 1;

if Z=11000, it means that the NB-PUCCH and/or NB-PUSCH is transmitted using a 4-tone having a sequence number of 2;

if Z=11001, it means that the NB-PUCCH and/or NB-PUSCH is transmitted using a 4-tone having a sequence number of 3;

if Z=11010, it means that the NB-PUCCH and/or NB-PUSCH is transmitted using a 6-tone having a sequence number of 1;

if Z=11011, it means that the NB-PUCCH and/or NB-PUSCH is transmitted using a 6-tone having a sequence number of 2.

As another embodiment, for resource allocation for 15 kHz uplink multi-tone NB-PUCCH and/or NB-PUSCH transmission, an uplink resource allocation type 0 of the existing LTE may be reused.

As another embodiment, for resource allocation for 3.75 kHz uplink single-tone NB-PUCCH and/or NB-PUSCH transmission, an uplink resource allocation type 0 of the existing LTE may be reused, and $N_{RB}^{UL}$ needs to be replaced with $N_{SC}^{UL,NB-IOT}$, where $N_{RB}^{UL}$, represents the number of physical resource blocks in an LTE uplink bandwidth, $N_{SC}^{UL,NB-IOT}$ represents the number of tones or subcarriers in one physical resource block in narrowband Internet of Things. For example, when the number of subcarriers contained in each PRB of LTE is changed from 12 to 48, it means that the number of tones contained in one PRB during 3.75 kHz uplink single-tone transmission is 48.

As another embodiment, for 3.75 kHz uplink single-tone transmission, a bitmap is used to indicate resource allocation for NB-PUCCH and/or NB-PUSCH transmission.

For example, a bitmap having a length of 48 is used to indicate resource allocation for NB-PUCCH and/or NB-PUSCH transmission; if the Nth bit is 0, it means that the Nth tone is not used for transmitting the NB-PUCCH and/or NB-PUSCH; if the Nth bit is 1, it means that the Nth tone is used for transmitting the NB-PUCCH and/or NB-PUSCH.

As another embodiment, for uplink single-tone transmission, a bit string is used to indicate resource allocation for NB-PUCCH and/or NB-PUSCH transmission.

For example, for 15 kHz uplink single-tone transmission, the bit string is denoted as A.

If A=0001, it means that the 1st tone is used for transmitting the NB-PUCCH and/or NB-PUSCH.

If A=0010, it means that the 2nd tone is used for transmitting the NB-PUCCH and/or NB-PUSCH.

If A=0011, it means that the 3rd tone is used for transmitting the NB-PUCCH and/or NB-PUSCH.

If A=0100, it means that the 4th tone is used for transmitting the NB-PUCCH and/or NB-PUSCH.

If A=0101, it means that the 5th tone is used for transmitting the NB-PUCCH and/or NB-PUSCH.

If A=0110, it means that the 6th tone is used for transmitting the NB-PUCCH and/or NB-PUSCH.

If A=0111, it means that the 7th tone is used for transmitting the NB-PUCCH and/or NB-PUSCH.

If A=1000, it means that the 8th tone is used for transmitting the NB-PUCCH and/or NB-PUSCH.

If A=1001, it means that the 9th tone is used for transmitting the NB-PUCCH and/or NB-PUSCH.

If A=1010, it means that the 10th tone is used for transmitting the NB-PUCCH and/or NB-PUSCH.

If A=1011, it means that the 11th tone is used for transmitting the NB-PUCCH and/or NB-PUSCH.

If A=1100, it means that the 12th tone is used for transmitting the NB-PUCCH and/or NB-PUSCH.

For another example, for 3.75 kHz uplink single-tone transmission, the bit string is denoted as B.

If A=000001, it means that the 1st tone is used for transmitting the NB-PUCCH and/or NB-PUSCH.

If A=000010, it means that the 2nd tone is used for transmitting the NB-PUCCH and/or NB-PUSCH.

And so on, until if A=110000, it means that the 48th tone is used for transmitting the NB-PUCCH and/or NB-PUSCH.

Step S303: The base station sends to a UE downlink control information carried by an NB-PDCCH, wherein the downlink control information includes the indication information. For example, the base station sends to the UE indication information carried by an NB-PDCCH and used for resource allocation for an NB-PUCCH and/or NB-PUSCH, wherein the indication information is used for indicating tone groups for transmitting the NB-PUCCH and/or NB-PUSCH and sequence numbers of the tone groups.

Figure 4:
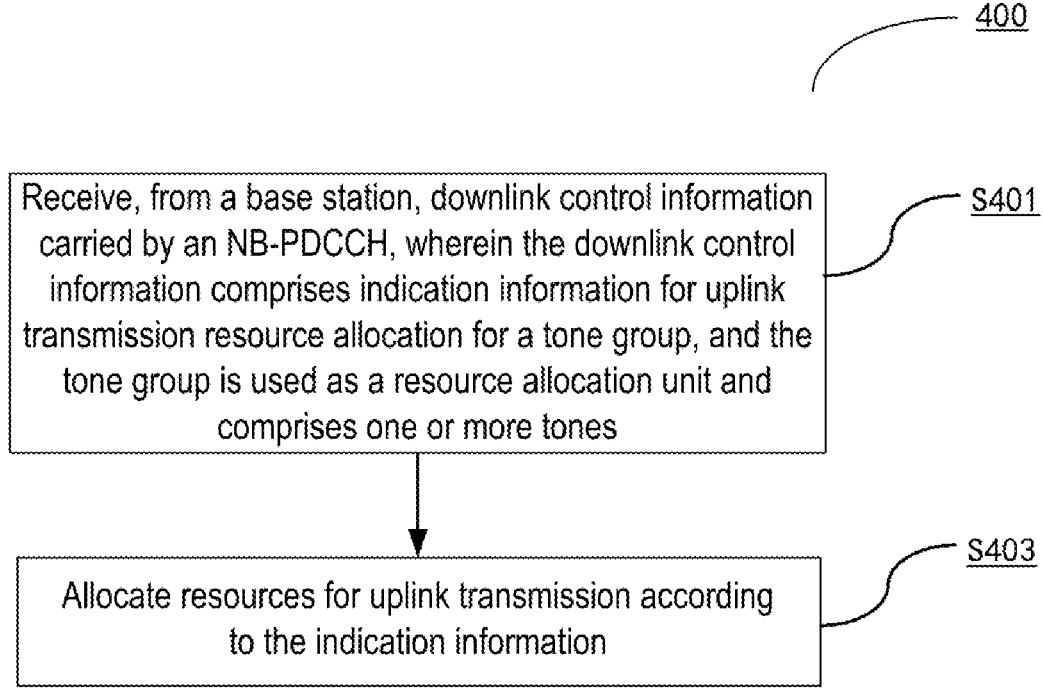
FIG. 4 schematically shows a flowchart of a method for uplink transmission resource allocation executed by a UE according to another embodiment of the present invention.

FIG. 4 schematically shows a flowchart of an uplink resource allocation indication method correspondingly executed by a UE according to an embodiment of the present invention. As shown in FIG. 4, the method 400 comprises the following steps.

Step S401: The UE receives, from a base station, downlink control information carried by an NB-PDCCH as described before. For example, the UE receives indication information carried by an NB-PDCCH and used for resource allocation for an NB-PUCCH and/or NB-PUSCH, wherein the indication information is used for indicating types of tone groups for transmitting the NB-PUCCH and/or NB-PUSCH and sequence numbers of the tone groups.

Step S403: The UE allocates resources for uplink transmission according to the indication information.

Figure 5:
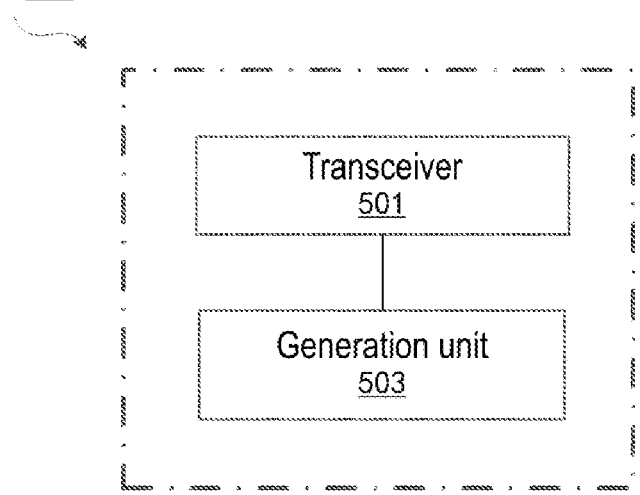
FIG. 5 schematically shows a structural block diagram of a base station according to an embodiment of the present invention.

FIG. 5 schematically shows a structural block diagram of a base station according to an embodiment of the present invention. It can be understood that only the base station structure related to the present invention is shown here to avoid confusion.

As shown in FIG. 5, the base station 500 includes a generation unit 501 and a transceiver 503.

In one embodiment, the base station 500 may execute the method 100 shown in FIG. 1.

Specifically, the generation unit 501 may generate first indication information and second indication information for uplink transmission resource allocation for a tone group, wherein the tone group is used as a resource allocation unit and comprises one or more tones.

The transceiver 503 may send to a user equipment (UE) a radio resource control (RRC) message comprising the first indication information, and send to the UE downlink control information carried by a narrowband physical downlink control channel (NB-PDCCH), wherein the downlink control information comprises the second indication information.

The first indication information comprises a set of tone groups, and the set of tone groups comprises one or more types of tone groups.

In the situation where the first indication information comprises one type of tone groups, the second indication information comprises a bit string for indicating sequence numbers of the type of tone groups for uplink transmission in a system bandwidth.

In the situation where the first indication information comprises multiple types of tone groups, the second indication information comprises a bit string, and the bit string comprises a first field indicating the types of the tone groups for uplink transmission and a second field indicating sequence numbers of the tone groups for uplink transmission.

In another embodiment, the generation unit 501 may generate first indication information for indicating whether hybrid multi-tone is supported, wherein supporting hybrid multi-tone being that transmission of multiple types of tone groups in one physical resource block is allowed, and generate second indication information for uplink transmission resource allocation for a tone group. The transceiver 503 may send to a user equipment (UE) a radio resource control (RRC) message comprising the first indication information, and send to the UE downlink control information carried by a narrowband physical downlink control channel (NB-PDCCH), wherein the downlink control information comprises the second indication information.

The second indication information may comprise a bitmap for indicating resource allocation for uplink transmission.

Alternatively, the second indication information may comprise a bit string, and the bit string comprises a first field indicating the types of the tone groups for uplink transmission and a second field indicating sequence numbers of the tone groups for uplink transmission.

In yet another embodiment, the base station 500 may execute the method 300 shown in FIG. 3.

Specifically, the generation unit 501 may generate indication information for uplink transmission resource allocation for a tone group, wherein the tone group is used as a resource allocation unit and comprises one or more tones.

The transceiver 503 may send to a user equipment (UE) downlink control information carried by an NB-PDCCH, wherein the downlink control information includes the indication information.

The indication information may include a first field indicating types of tone groups for uplink transmission and a second field indicating sequence numbers of the tone groups for uplink transmission.

Alternatively, the indication information comprises a bit string that enables the UE to find allocated resources by referring to a mapping table.

Alternatively, the indication information may indicate reusing an uplink resource allocation type 0 of LTE and replacing $N_{RB}^{UL}$ with $N_{SC}^{UL,NB-IOT}$ wherein $N_{RB}^{UL}$ being the being the number of physical resource blocks in an LTE uplink bandwidth, and $N_{SC}^{UL,NB-IOT}$ being the number of tones or subcarriers in one physical resource block in narrowband Internet of Things.

Alternatively, the indication information may comprise a bitmap for indicating resource allocation for uplink transmission.

Figure 6:
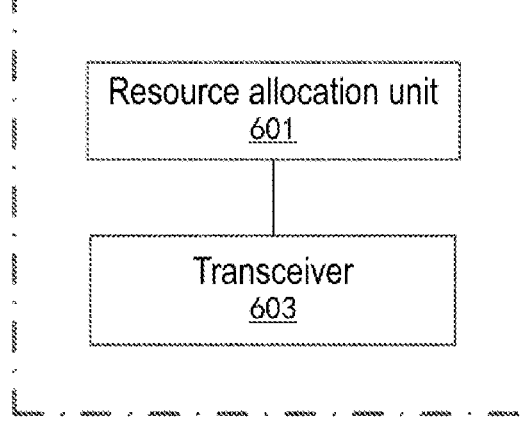
FIG. 6 schematically shows a structural block diagram of a UE according to an embodiment of the present invention.

FIG. 6 schematically shows a structural block diagram of a UE according to an embodiment of the present invention. It can be understood that only the UE structure related to the present invention is shown here to avoid confusion.

As shown in FIG. 6, the UE 600 includes a transceiver 601 and a resource allocation unit 603.

In one embodiment, the UE 600 may execute the method 200 shown in FIG. 2.

Specifically, the transceiver 601 may receive, from a base station, a radio resource control (RRC) message, wherein the RRC message includes first indication information for uplink transmission resource allocation for a tone group, and the tone group is used as a resource allocation unit and comprises one or more tones; and receive, from the base station, downlink control information carried by an NB-PDCCH, wherein the downlink control information comprises second indication information for uplink transmission resource allocation for the tone group.

The resource allocation unit 603 may allocate resources for uplink transmission according to the first indication information and the second indication information.

In another embodiment, the transceiver 601 may, from a base station, a radio resource control (RRC) message, wherein the RRC message comprises first indication information for indicating whether hybrid multi-tone is supported, and supporting hybrid multi-tone being that transmission of multiple types of tone groups in one physical resource block is allowed; and receive, from the base station, downlink control information carried by an NB-PDCCH, wherein the downlink control information includes second indication information for uplink transmission resource allocation for a tone group.

The resource allocation unit 603 may allocate resources for uplink transmission according to the first indication information and the second indication information.

In yet another embodiment, the UE 600 may execute the method 400 shown in FIG. 4.

Specifically, the transceiver 601 may receive, from a base station, downlink control information carried by an NB-PDCCH, wherein the downlink control information comprises indication information for uplink transmission resource allocation for a tone group, and the tone group is used as a resource allocation unit and comprises one or more tones; and the resource allocation unit 603 may allocate resources for uplink transmission according to the indication information.

The methods and related devices according to the present invention have been described above in conjunction with preferred embodiments. It should be understood by those skilled in the art that the methods shown above are only exemplary. The method of the present invention is not limited to steps or sequences illustrated above. The network node and the user equipment illustrated above may comprise more modules; for example, they may further comprise modules which can be developed or developed in the future to be applied to modules of a base station, an MME, or a UE. Various identifiers shown above are only exemplary, and are not meant for limiting the present invention. The present invention is not limited to specific information elements serving as examples of these identifiers. Those skilled in the art may make numerous alterations and modifications as illustrated in the shown embodiments.

It should be understood that the above-described embodiments of the present invention may be implemented through software, hardware, or a combination of software and hardware. For example, various components of the base station and user equipment in the above embodiments can be implemented through multiple devices; and these devices include, but are not limited to, an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" refers to a mobile communication data and control switching center with large transmission power and wide coverage area, including resource allocation scheduling, data receiving, and transmitting functions. The term "user equipment" refers to a user mobile terminal, such as a terminal device that can perform wireless communication with a base station or a micro base station, including a mobile phone, a notebook, or the like.

In addition, the embodiments of the present invention, disclosed here, may be implemented on a computer program product. More specifically, the computer program product is a product as follows: The product has a computer-readable medium on which computer program logic is encoded. The computer program logic, when executed on a computing device, provides relevant operations to implement the above-described technical solutions of the present invention. The computer program logic enables a processor to execute the operations (methods) described in the embodiments of the present invention when the product is executed on at least one processor of a computing system. Such an arrangement of the present invention is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing device so that one or more processors in the computing device execute the technical solutions described in the embodiments of the present invention.

In addition, each functional module or each feature of the base station equipment and the terminal equipment used in each of the above embodiments may be implemented or executed by a circuit, which is usually one or more integrated circuits. Circuits designed to perform various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor, or the processor may be an existing processor, a controller, a microcontroller, or a state machine. The above-described general-purpose processor or each circuit may be configured by a digital circuit or may be configured by a logic circuit. In addition, when an advanced technology that can replace current integrated circuits emerges due to advances in semiconductor technology, the present invention may also use integrated circuits obtained using this advanced technology.

Although the present invention has been shown in connection with the preferred embodiments of the present invention, it will be understood by those skilled in the art that various modifications, substitutions and alterations may be made to the present invention without departing from the spirit and scope of the present invention. Accordingly, the present invention should not be defined by the above-described embodiments, but should be defined by the appended claims and their equivalents.

The invention claimed is:

1. A user equipment (UE), comprising:
a receiving circuitry
to receive indication information carried by narrowband physical downlink control channel (NPDCCH), which indicates the subcarriers of narrowband physical uplink shared channel (NPUSCH) assigned for UE,
wherein when subcarrier spacing of NPUSCH is 3.75 kHz, the receiving circuitry uses the indication information to indicate one subcarrier from possible assigned subcarriers and
when subcarrier spacing of NPUSCH is 15 kHz, the receiving circuitry uses the indication information to indicate a set of one or more allocated subcarrier(s) according to a predefined mapping table, wherein the table includes entries for single subcarrier's allocation and entries for multiple subcarriers' allocation,
wherein the number of allocated subcarriers is 1, 3, 6 or 12.

2. A base station, comprising:
a generation circuitry
to generate indication information carried by narrowband physical downlink control channel (NPDCCH), which indicates the subcarriers of narrowband physical uplink shared channel (NPUSCH) assigned for UE,
wherein when subcarrier spacing of NPUSCH is 3.75 kHz, the generation circuitry uses the indication information to indicate one subcarrier from possible assigned subcarriers and
when subcarrier spacing of NPUSCH is 15 kHz, the generation circuitry uses the indication information to indicate a set of one or more allocated subcarrier(s) according to a predefined mapping table, wherein the table includes entries for single subcarrier's allocation and entries for multiple subcarriers' allocation,
wherein the number of subcarriers is 1, 3, 6 or 12; and
a transmission circuitry to transmit the indication information carried by NPDCCH.

* * * * *